March 3, 1970     C. E. WILLIAMS     3,497,876

URINAL FLUSHING CONTROL SYSTEM

Filed Feb. 16, 1967

United States Patent Office 3,497,876
Patented Mar. 3, 1970

3,497,876
URINAL FLUSHING CONTROL SYSTEM
Charles Edward Williams, 18 Orchard Crescent,
Box Hill North, Victoria, Australia
Filed Feb. 16, 1967, Ser. No. 616,658
Claims priority, application Australia, Feb. 23, 1966,
2,048/66
Int. Cl. E04d *13/00;* G05b *5/00*
U.S. Cl. 4—100                                             5 Claims

ABSTRACT OF THE DISCLOSURE

Urinal flushing control circuit whereby flushing is effected when a predetermined urinal effluent impurity content is reached by means of detection electrodes located in contact with the flushing water and the effluent, which electrodes are connected in a balanced circuit to measure the relative conductivities of the flushing water and the urinal effluent, the circuit producing a difference comparison control signal which is fed through trigger, period, and interval timing networks to control the flushing.

---

This invention relates to an urinal or other effluent disposal flushing control system. In particular, the invention provides an urinal flushing control system which is suitable for use in public, industrial, or other large sanitary installations.

It is well known to control the flushing of urinals in a time cycle which may be regular, or which may be programmed to an irregular cycle according to estimated requirement. For example, a large city office building installation may be designed to have an active "office hours" cycle and a passive "after hours" cycle.

However, it is likely that flushing based on the estimated requirement, can be inefficient and wasteful, for example, when the day is a holiday an active cycle is unnecessary, or it can fail to adequately service the urinal at times of unforeseen high useage.

It is also known to control liquid in sanitary disposal systems by the use of electrodes located in a receptacle so as to sense the accumulation of material up to a predetermined level.

It is an object of the present invention to provide an urinal or other effluent flushing control system wherein flushing is effected when a predetermined effluent impurity content is reached.

It is a further object of the invention to provide a control circuit for use in the aforementioned flushing control system, whereby inefficient and wasteful flushing is avoided.

According to the invention there is provided an effluent flushing control system for use in an effluent disposal installation having controlled water flushing comprising, flushing water control means, a first electrical detection means located in electrical contact with the effluent for measuring effluent impurity in terms of the conductivity of said effluent, a further electrical detection means located in electrical contact with the flushing water for measuring flushing water impurity in terms of the conductivity of said flushing water, electrical control means connected to said flushing water control means, said first and further detection means being connected to said electrical control means to control said flushing means in accordance with a predetermined variation detected in the effluent impurity conductivity compared with the conductivity of the flushing water.

In another form of the invention there is provided, a control circuit for use in a flushing control system comprising a first detection means for electrical contact with flushing water, a second detection means for electrical contact with effluent, said first and second detection means being connected by a transformer in a balanced circuit for producing an output signal in dependence on a difference comparison of the respective levels of an electrical characteristic of said flushing water and said effluent, and means for effecting flushing initiated by said output signal.

Further features and objects of the invention will become apparent from the following description with reference to embodiments of the invention illustrated in the accompanying drawings, wherein.

Figure 1:
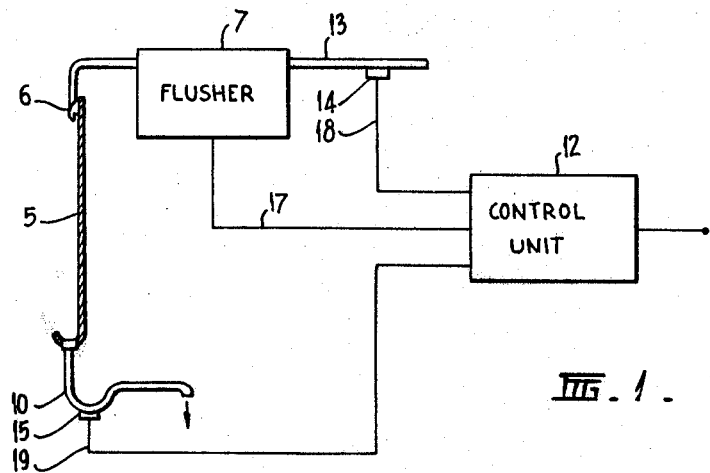
FIGURE 1 is a view partly in side elevation section and partly schematic, showing the general arrangement of an urinal flushing control system according to the invention.

Referring to FIGURE 1 of the drawings, an urinal wall 5 is flushed with water sprayed by flushing nozzle 6. Nozzle 6 is supplied with water under the control of flusher 7.

A gooseneck drainage pipe 10 is connected to the base of wall 5 for urinal effluent drainage.

Flushing water from flusher 7 is supplied under electrical control by means of, for example, a solenoid controlled water valve, or any other suitable electrical water flow control means such as an electrical pump.

Control unit 12 contains electronic amplifying, control, and timing circuits for the control of the electrical water flow control means as hereinafter described.

Flusher pipe 13 is fitted with a detector electrode 14 so as to provide electrical contact with the flushing water. A further detector electrode 15 is mounted in gooseneck outlet pipe 10 so as to provide electrical contact with the effluent.

Electrical connection 17 is made between the flusher 7 and the control unit 12, and electrical connections 18 and 19 are made between the respective detector electrodes 14 and 15 and the control unit 12.

Figure 2:
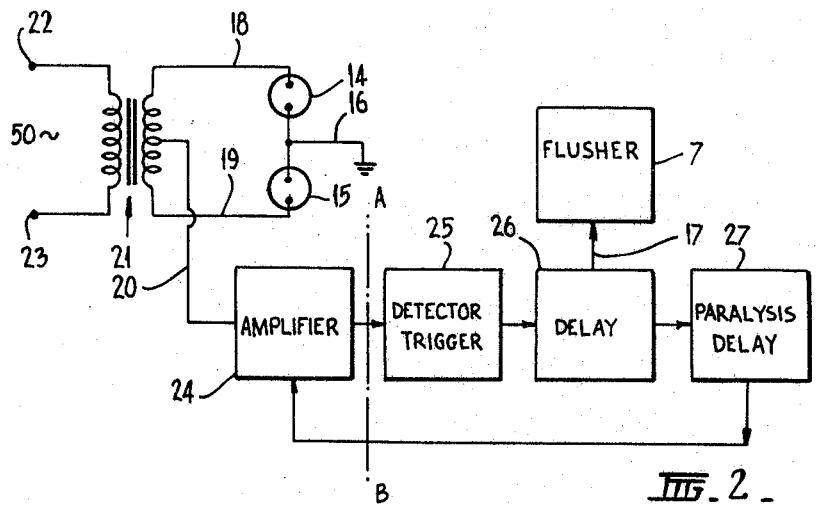
FIGURE 2 is a schematic diagram of a flushing control circuit which may be used in the system shown in FIGURE 1.

FIGURE 2 shows the circuit arrangement of the control unit and the circuit connections to detectors 14 and 15 and flusher 7 as already identified in FIGURE 1.

Flushing water detector electrode 14 and effluent detector electrode 15 are connected through leads 18 and 19 to transformer 21 in control unit 12. The detectors 14 and 15 and transformer 21 are connected in a bridge circuit. The bridge circuit is completed to an earth, which may be provided by an earth return to control unit 12 through the pipes 10 and 13 of FIGURE 1.

Transformer 21 supplies a 50 cycle alternating current across the bridge circuit from input terminals 22 and 23, so that currents are induced to flow through the flushing water and the effluent, the conductivities of which form part of the bridge circuit.

The bridge circuit is unbalanced so as to supply an output signal on lead 20 when a difference between conductivity levels is detected through electrodes 14 and 15. Since the measured conductivity difference between the flushing water and the effluent provides an accurate indication of additional impurity and therefore urine content, and output signal can be used as a control signal to operate the flusher 7 when the effluent impurity reaches an undesired concentration in the urinal drainage outlet.

The control unit 12 also comprises a transistor amplifier 24 which is connected to the lead 20 carrying the bridge circuit output signal, a signal detector and trigger circuit 25, and delay circuits 26 and 27. The detector-trigger circuit 25 provides a predetermined threshold before operation of the flusher is initiated corresponding to a minimum desired ratio of conductivity levels which is to be attained before the circuit 25 passes a detected control signal to delay circuit 26. Delay circuit 26 includes a holding network which may be adjusted to effect a predetermined duration of flushing. Delay circuit 27 effects a predetermined interval by feeding a flushing paralysis signal to amplifier 24 which inhibits the operation of the control system. All these electronic control circuits per se are well known and therefore will not be described in detail.

Figure 3:
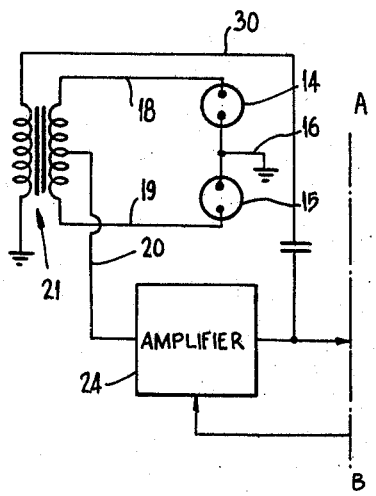
FIGURE 3 is a schematic diagram of an alternative circuit arrangement which may be substituted for that part of the circuit where indicated by the line A–B in FIGURE 2.

Referring to FIGURE 3, where components referred to above are identified by the same reference numerals, amplifier 24 is an unstable amplifier which includes a feedback return path 30 through transformer 21. The transformer 21 is connected with detector electrodes 14 and 15 in a bridge circuit which is unbalanced by a difference in conductivity levels in the flushing water and effluent to produce a signal at lead 20 as described above.

The feedback through transformer 21 is such as to maintain amplifier 24 in a stable condition while the bridge circuit is balanced and to render the amplifier unstable when the bridge circuit is unbalanced and fed with a current so that it will oscillate. The frequency response of the network is designed so that the resonant frequency of oscillation is of the order of 1,000 cycles.

The signal so generated is fed to detector-trigger circuit 25 for derivation of a control signal in the manner described above.

It has been found that a frequency of 1,000 cycles for the signal is advantageous by reason of its comparatively low corrosion effects arising from electrolysis in the drainpipe 10. There is also a reduction of creepage in the operating point for the same reason. Furthermore, use of such a signal frequency reduces erroneous operation which may be caused by induction and leakage of 50 cycle currents from earth loops into the control system. Furthermore, checking of operation of the control system is simplified by use of the signal frequency within the audio range, which allows direct use of an earphone and probe to detect 1,000 cycle tone.

The bridge circuit operates with a current detector i.e. the amplifier has a very low input impedance. Operation in this manner broadens the balance null. This provides a non-critical operating point for the control system and allows the bridge circuit to be self-compensating for minor changes in the impurity content and temperature of the flushing water, and hence the conductivity of the flushing water, while still providing a readily detectable change in the ratio of conductivities between the flushing water and the effluent.

Although, in the embodiments described above, the control signal is derived from a balanced bridge detector system, the invention may operate in a simplified form by dispensing with the transformer 21 shown in FIGURE 2 and deriving the control signal from a single conductivity detector 15 located in the effluent drain outlet pipe 10. In this form, the current derived from the detector 15 becomes effective as a control signal on exceeding a pre-determined delay current level provided in the amplifier 24 and processing of the signal occurs as described with reference to FIGURE 2.

Furthermore, although it is preferred to use alternating current for derivation of the control signal from the detector electrodes since the A.C. signal minimizes polarization errors at the electrodes, and the derived A.C. control signal is more conveniently amplified and detected than a direct current signal, in a simplified form, the transformer 21 can be dispensed with and a direct current can be applied directly through the effluent detector electrodes. A derived control signal which is indicative of a change in conductivity of the effluent can be applied to the amplifier 24 and used for flushing control as described with reference to FIGURE 2.

An effluent impurity detector operating the flushing control according to measurement of effluent conductivity only, may be satisfactory where the water supply maintains a uniform impurity level, and hence uniform conductivity, over a long period of time. However, the use of ratio detection between the impurity of the supply water and the impurity of the effluent liquid ensures that the possibly variable factor of supply water impurity is cancelled and thus provides more accurate flushing control.

I claim:

1. An effluent flushing control system for use in an effluent disposal installation having controlled water flushing comprising flushing water control means, a first electrical detection means located in electrical contact with the effluent for measuring effluent impurity in terms of the conductivity of said effluent, a further electrical detection means located in electrical contact with the flushing water for measuring flushing water impurity in terms of the conductivity of said flushing water, and electrical control means connected to said flushing water control means, said first and further detection means being connected to said electrical control means to control said flushing means in accordance with a predetermined variation detected in the affluent conductivity compared with the conductivity of the flushing water, the effluent detection means and the flushing water detection means being connected in a balanced circuit which provides an output signal when a difference between the conductivities of effluent and flushing water is detected, said electrical control means including signal threshold means whereby operation of the flushing means by said output signal is not initiated until a measured minimum effluent impurity is exceeded, and signal delay means whereby the flushing means is operated by said output signal for a predetermined period.

2. A system as claimed in claim 1 comprising a transformer, said detection means being connected by said transformer in said balanced circuit for producing said output signal.

3. A system as claimed in claim 2 comprising means for supplying an alternating current to said detection means through said transformer to enable a comparison of the conductivities.

4. A system as claimed in claim 2, comprising an amplifier and wherein said transformer is connected to said amplifier in a feedback network and said output signal is generated by self-oscillation of the amplifier.

5. A flushing control system as claimed in claim 1, wherein said electric control means includes a signal paralysis delay means whereby operation of the flushing means by said output signal is suspended for a predetermined interval.

References Cited

UNITED STATES PATENTS

| 1,683,062 | 9/1928 | Bright | 4—100 |
| 1,709,083 | 4/1929 | Littlefield | 4—100 |
| 3,024,469 | 3/1962 | Lewis et al. | 4—199 |
| 3,115,643 | 12/1963 | Whitney | 4—100 |
| 3,239,847 | 3/1966 | Parr | 4—100 |
| 3,373,449 | 3/1968 | Rusnok | 4—100 |

LAVERNE D. GEIGER, Primary Examiner

HENRY K. ARTIS, Assistant Examiner

U.S. Cl. X.R.

318—466